United States Patent
Reuche (10) Patent No.: US 11,838,703 B2
(45) Date of Patent: Dec. 5, 2023

(54) METHOD FOR ESTABLISHING COMMUNICATION IN AN OPTICAL ACCESS NETWORK

(71) Applicant: SAGEMCOM BROADBAND SAS, Rueil Malmaison (FR)

(72) Inventor: Anthony Reuche, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/918,411

(22) PCT Filed: Apr. 19, 2021

(86) PCT No.: PCT/EP2021/060052
§ 371 (c)(1),
(2) Date: Oct. 12, 2022

(87) PCT Pub. No.: WO2021/213965
PCT Pub. Date: Oct. 28, 2021

(65) Prior Publication Data
US 2023/0144926 A1    May 11, 2023

(30) Foreign Application Priority Data

Apr. 22, 2020  (FR) ...................... 2003998

(51) Int. Cl.
*H04Q 11/00* (2006.01)
*H04L 7/10* (2006.01)

(52) U.S. Cl.
CPC ........... *H04Q 11/0067* (2013.01); *H04L 7/10* (2013.01); *H04Q 2011/0064* (2013.01)

(58) Field of Classification Search
CPC ..... H04B 10/27; H04B 10/40; H04B 10/2581
See application file for complete search history.

(56) References Cited

U.S. PATENT DOCUMENTS

2012/0008948 A1* 1/2012 Kazawa ............ H04Q 11/0067
                                                         398/58
2020/0204257 A1* 6/2020 Krampl ................. H04B 10/25
(Continued)

FOREIGN PATENT DOCUMENTS

| CA | 3 052 662 A1 | 2/2020 |
| JP | 5097641 B2 | 12/2012 |
| JP | 5097655 B2 | 12/2012 |

OTHER PUBLICATIONS

Jul. 21, 2021 Search Report issued in International Patent Application No. PCT/EP2021/060052.
(Continued)

*Primary Examiner* — Dzung D Tran
(74) *Attorney, Agent, or Firm* — Williams Mullen; R. Brian Drozd (57) ABSTRACT

An item of ONU equipment configures itself for communicating via a first transport system with an item of OLT equipment in an optical access network, and starts a synchronisation for the first transport system and transmits via the first transport system. The OLT equipment transmits, via a protocol layer fitting on top of the entire transport system of the optical access network, without waiting for the synchronisation for the first transport system to have ended, a message indicating which transport system is to be used by the ONU equipment. When the transport system to be used by the ONU equipment is the first transport system, the synchronisation continues the first communication system, otherwise the synchronisation is restarted for the second transport system.

13 Claims, 5 Drawing Sheets

(56) References Cited

U.S. PATENT DOCUMENTS

2021/0006334 A1* 1/2021 Yoshino ............. H04Q 11/0005
2022/0292043 A1* 9/2022 Yoshino ............. G06F 13/4068
2022/0329321 A1* 10/2022 Yoshino .................. H04L 12/44

OTHER PUBLICATIONS

Jul. 21, 2021 Written Opinion of the International Searching Authority issued in International Patent Application No. PCT/EP2021/060052.

* cited by examiner

METHOD FOR ESTABLISHING COMMUNICATION IN AN OPTICAL ACCESS NETWORK

TECHNICAL FIELD

The present invention relates to a method for establishing communication in an optical access network of the passive optical network PON type, more particularly between optical line termination OLT equipment and user equipment referred to as "optical network unit" ONU.

PRIOR ART

The distribution of digital data by optical access network to a plurality of users, to access the internet for example, is implemented through an optical fibre medium. FTTH (standing for "Fibre to the Home") or FTTB (Fibre to the Building") technology is spoken of. Thus a plurality of data transport systems may coexist on one and the same optical fibre, thus enabling a service operator to distribute a plurality of services through a reduced infrastructure. Passive optical networks PON can thus be created between one or more items of optical line termination equipment OLT and numerous items of user equipment ONU, by means of wavelength coupling devices and optical line coupling devices of users.

The various transport systems correspond to standardised equipment and protocols, for example the G-PON ("Gigabit Passive Optical Network") system that makes it possible to achieve a speed of 2.5 Gbps in the downlink direction and a speed of 1.2 Gbps in the uplink direction, as described by the ITU-T G.984 standard, or the XG-PON ("eXtended Gigabit Passive Optical Network") system, which makes it possible to achieve a speed of 10 Gbps in the downlink direction and a speed of 2.5 Gbps in the uplink direction, as described by the ITU-T G.988 standard, or the XGS-PON ("10 Gigabit-capable Symmetric Passive Optical Network") system, which makes it possible to achieve a speed of 10 Gbps in both the uplink and downlink directions, as described by the ITU-T G.9807.1 standard.

When various transport systems coexist on one and the same optical fibre, each of these transport systems establishes communications by light signals using distinct carrier wavelengths ($\lambda$) or combs of carrier wavelengths, whether in the uplink direction or in the downlink direction, and/or using time division multiple access TDMA mechanisms for access to the optical fibre.

The coexistence of the various transport systems on one and the same optical fibre enables an item of user equipment ONU to be configured for using, according to a user profile established with the termination equipment OLT for the user equipment ONU in question, a single transport system among those distributed via this optical fibre.

Currently, in the case where an item of user equipment ONU must be connected to an optical fibre on which a plurality of transport systems coexist, human intervention, by an installing technician for example, is necessary in order to correctly configure the user equipment ONU for using the transport system that corresponds to a user profile registered at the termination equipment OLT. This human intervention is also necessary if a change of user profile occurs at the termination equipment OLT, for example to change from an optical fibre service at 500 Mbps using the G-PON protocol to an optical fibre service at 10 Gbps using the XGS-PON protocol. However, such human intervention is subject to configuration errors, which gives rise in particular to increases in telephone assistance ("hotline") requirements.

It is then desirable to overcome these drawbacks of the prior art.

It is in particular desirable to provide a solution that makes it possible to reduce human interventions for enabling an item of user equipment ONU, capable of communicating by means of a plurality of transport systems coexisting on one and the same optical fibre, to be configured for communicating via a particular transport system, among a plurality of possible transport systems.

It is in particular desirable to accelerate the establishment of communication of such an item of user equipment ONU.

It is in particular desirable to provide a solution that makes it possible to reduce human interventions when changing user profile.

DISCLOSURE OF THE INVENTION

A method for putting an item of user equipment of the ONU type in communication with an item of line termination equipment of the OLT type in an optical access network offering various transport systems is proposed, the user equipment supporting at least two transport systems, each transport system being a communication set comprising a dedicated protocol, the method comprising the following steps:
- the user equipment configures itself for communicating by means of a first transport system among the transport systems supported by the user equipment;
- the user equipment starts a synchronisation with the line termination equipment for the first transport system;
- the line termination equipment transmits, via a protocol layer fitting on top of any transport system of the optical access network, without waiting for the synchronisation with the user equipment for the first transport system to have ended, a first message indicating which transport system is to be used by the user equipment;
- when the transport system to be used by the user equipment is the first transport system, the user equipment continues the synchronisation for the first transport system until communication is established in the optical access network;
- when the transport system to be used by the user equipment is a second transport system different from the first transport system, the user equipment configures itself for communicating by means of the second transport system and implements the synchronisation for the second transport system until communication is established in the optical access network.

Thus the configuration of the user equipment of the ONU type is automatic, without human intervention. In addition, when the user equipment of the ONU type must change transport system, the end of the synchronisation with the transport system initially selected is not awaited, which accelerates the establishment of communication of the user equipment of the ONU type in the optical access network.

According to a particular embodiment, the user equipment transmits, by means of the first transport system, to the line termination equipment, an identifier of the user equipment and the line termination equipment obtains, in a database, a user profile associated with the identifier of the user equipment, the user profile including the information on the transport system to be used by the user equipment. Thus the establishment of communication of the user equipment in the optical access network is in accordance with a user profile provided.

According to a particular embodiment, when no user profile is associated with the identifier of the user equipment, the first message contains an error message. Thus the user equipment of the ONU type does not have to strive to attempt to synchronise in the optical access network.

According to a particular embodiment, the protocol layer fitting on top of any transport system of the optical access network is OMCI ("ONU Management and Control Interface") and the first message includes a configuration object of the "Managed Entity" type indicating the transport system to be used by the user equipment. Thus the method is easily implemented in common optical access networks on the market.

According to a particular embodiment, when a change of transport system to be used by the user equipment occurs and furthermore the user equipment is already put in communication in the optical access network, the line termination equipment transmits, via the protocol layer fitting on top of any transport system of the optical access network, a second message indicating which transport system is now to be used by the user equipment, and the user equipment configures itself for communicating by means of the transport system now to be used and implements the synchronisation for the transport system now to be used until communication is established in the optical access network. Thus the configuration of the user equipment of the ONU type is automatic, without human intervention even when the user profile changes on the way.

According to a particular embodiment, the user equipment obtains information representative of the first transport system from a parameter stored in non-volatile memory of the user equipment and, on reception of any message coming from the line termination equipment indicating the transport system to be used by the user equipment, the user equipment updates said parameter with information representative of the transport system to be used by the user equipment as indicated in said message. Thus, in a future restart or when there is a loss of synchronisation of the user equipment of the ONU type, the establishment of communication is more rapid.

According to a particular embodiment, when the user equipment does not detect any signals, while having configured itself for the first transport system, during a time window of predefined duration, the user equipment then tests another transport system among those supported by the user equipment. Thus the user equipment of the ONU type can ultimately be put in a communication in the optical access network, even when a transport system supported by the user equipment of the ONU type is not or is no longer supported by the line termination equipment of the OLT type.

A method for putting an item of user equipment of the ONU type in communication with an item of line termination equipment of the OLT type in an optical access network is also proposed, the method being implemented by the user equipment, the user equipment supporting at least three transport systems, each transport system being a communication set comprising a dedicated protocol, the method comprising the following steps:

configuring the user equipment for communicating by means of a first transport system among the transport systems supported by the user equipment;

starting a synchronisation with the line termination equipment for the first transport system;

receiving, via a protocol layer fitting on top of all the transport systems supported by the user equipment, without waiting for the synchronisation with the line termination equipment for the first transport system to have ended, a message indicating which transport system is to be used by the user equipment;

when the transport system to be used by the user equipment is the first transport system, continuing the synchronisation for the first transport system until communication is established in the optical access network;

when the transport system to be used by the user equipment is a second transport system different from the first transport system, configuring the user equipment for communicating by means of the second transport system and implementing the synchronisation for the second transport system until communication is established in the optical access network.

A method for putting an item of user equipment of the ONU type in communication with an item of line termination equipment of the OLT type in an optical access network is also proposed, the method being implemented by the line termination equipment, the line termination equipment supporting various transport systems, each transport system being a communication set comprising a dedicated protocol, the method comprising the following steps:

starting a synchronisation with the user equipment, at the initiative of the latter, for a first transport system;

transmitting, via a protocol layer fitting on top of the transport systems supported by the line termination equipment, without waiting for the synchronisation with the user equipment for the first transport system to have ended, a message indicating which transport system is to be used by the user equipment;

when the transport system to be used by the user equipment is different from the first transport system, starting a synchronisation with the user equipment, at the initiative of the latter, for said transport system to be used by the user equipment.

A computer program is also proposed, which can be stored on a medium and/or downloaded from a communication network in order to be read by a processor. This computer program comprises instructions for implementing the method implemented by the user equipment, as mentioned above, or the method implemented by the line termination equipment, as mentioned above, when said program is executed by the processor. The invention also relates to an information storage medium storing such a computer program.

An item of user equipment of the ONU type intended to be put in communication with an item of line termination equipment of the OLT type in an optical access network is also proposed, the user equipment supporting at least two transport systems, each transport system being a communication set comprising a dedicated protocol, the user equipment comprising:

means for configuring the user equipment for communicating by means of a first transport system among the transport systems supported by the user equipment;

means for starting a synchronisation with the line termination equipment for the first transport system;

means for receiving, via a protocol layer fitting on top of all the transport systems supported by the user equipment, without waiting for the synchronisation with the line termination equipment for the first transport system to have ended, a message indicating which transport system is to be used by the user equipment;

when the transport system to be used by the user equipment is the first transport system, means for continuing the synchronisation for the first transport system until communication is established in the optical access network;

when the transport system to be used by the user equipment is a second transport system different from the first transport system, means for configuring the user equipment for communicating by means of the second transport system and implementing the synchronisation for the second transport system until communication is established in the optical access network.

An item of line termination equipment of the OLT type intended to be put in communication with an item of user equipment of the ONU type in an optical access network is also proposed, the line termination equipment supporting various transport systems, each transport system being a communication set comprising a dedicated protocol, the line termination equipment comprising:

means for starting a synchronisation with the user equipment, at the initiative of the latter, for a first transport system;

means for transmitting, via a protocol layer fitting on top of the transport systems supported by the line termination equipment, without waiting for the synchronisation with the user equipment for the first transport system to have ended, a message indicating which transport system is to be used by the user equipment;

when the transport system to be used by the user equipment is different from the first transport system, means for starting a synchronisation with the user equipment, at the initiative of the latter, for said transport system to be used by the user equipment.

An optical access network comprising an item of line termination equipment of the OLT type as mentioned above and at least one item of user equipment of the ONU type as mentioned above is also proposed.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1A:
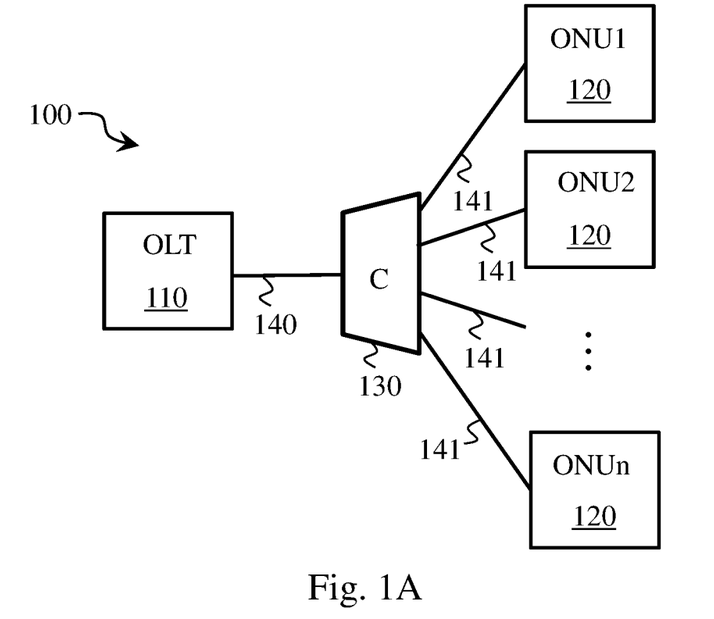
FIG. 1A illustrates schematically a first arrangement of an optical access network, wherein the present invention can be implemented.

FIG. 1A illustrates schematically a first arrangement of an optical access network 100, of the PON type, wherein the present invention can be implemented. The optical access network 100 comprises an item of optical line termination equipment OLT 110 (simply referred to hereinafter as OLT equipment) and a plurality of items of user equipment called "optical network units" ONU 120 (labelled ONU1, ONU2, . . . , ONUn on FIG. 1A and simply hereinafter referred to as ONU equipment). Each item of ONU equipment 120 is capable of communicating with the OLT equipment 110 by means of a plurality of transport systems coexisting on one and the same optical fibre 140. A communication set comprising a dedicated protocol is referred to as a transport system. Each transport system is furthermore potentially defined by one or more dedicated carrier wavelengths in the uplink direction (i.e. from an item of ONU equipment 120 to the OLT equipment 110) and in the downlink direction (i.e. from the OLT equipment 110 to the items of ONU equipment 120). Typically, the transport systems have different performances, such as different speeds, and are therefore adapted to offer different services.

At least two transport systems coexist on the optical fibre 140. In a particular embodiment, at least three transport systems coexist on the optical fibre 140. According to a particular embodiment, the transport systems are, at least, a transport system of the G-PON type, a transport system of the XG-PON type and for example a transport system of the XGS-PON type.

According to other embodiments, at least one of the transport systems is of the NG-PON2 type (Next-Generation Passive Optical Network 2, as defined in the ITU-T G.989 standard), or of the XG-PON2 type (symmetric speed XG-PON), or of the EPON type (Ethernet Passive Optical Network).

In another embodiment, at least one of the transport systems is compatible with an optical transport technology of the 100G type able to achieve 100 Gbit/s.

In a particular embodiment, the items of ONU equipment 120 are integrated in residential gateways.

To make it possible to connect the plurality of items of ONU equipment 120 to the optical fibre 140, the optical access network 100 comprises a coupling device C 130 adapted for coupling as many user optical lines 141 as there are items of ONU equipment 120.

Figure 1B:
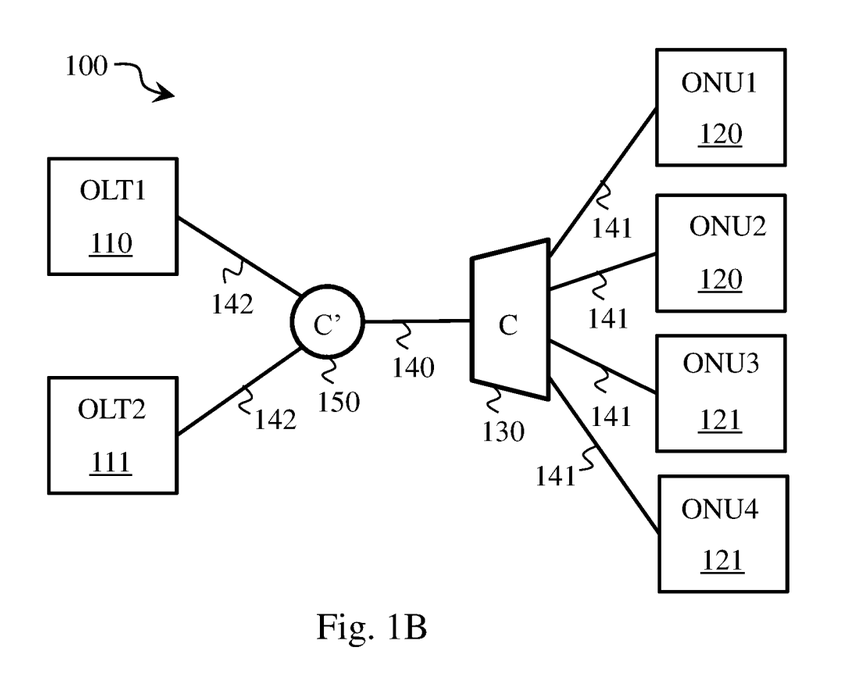
FIG. 1B illustrates schematically a second arrangement of an optical access network, wherein the present invention can be implemented.

FIG. 1B illustrates schematically a second arrangement of an optical access network 100, wherein the present invention can be implemented. Compared with the first arrangement in FIG. 1A, the second arrangement in FIG. 1B comprises a wavelength coupling device C' 150 for coupling two other optical lines 142 to the optical fibre 140. These other optical lines 142 enable at least one other item of OLT equipment (labelled OLT2 111 on FIG. 1B) to coexist with the OLT equipment 110 (labelled OLT1 110 on FIG. 1B) in the optical access network 100. Thus, on one and the same optical fibre 140, the items of ONU equipment 120 (labelled ONU1 and ONU2 on FIG. 1B) can communicate with the item of equipment OLT1 110, and items of ONU equipment 121 (labelled ONU3 and ONU4 on FIG. 1B) can communicate with the item of equipment OLT2 111.

The coupling devices C 130 and C' 150 are for example selective wavelength switches WSS (Wavelength Selective Switches) adapted for multiplexing wavelengths in one direction and demultiplexing wavelengths in the opposite direction.

Figure 2:
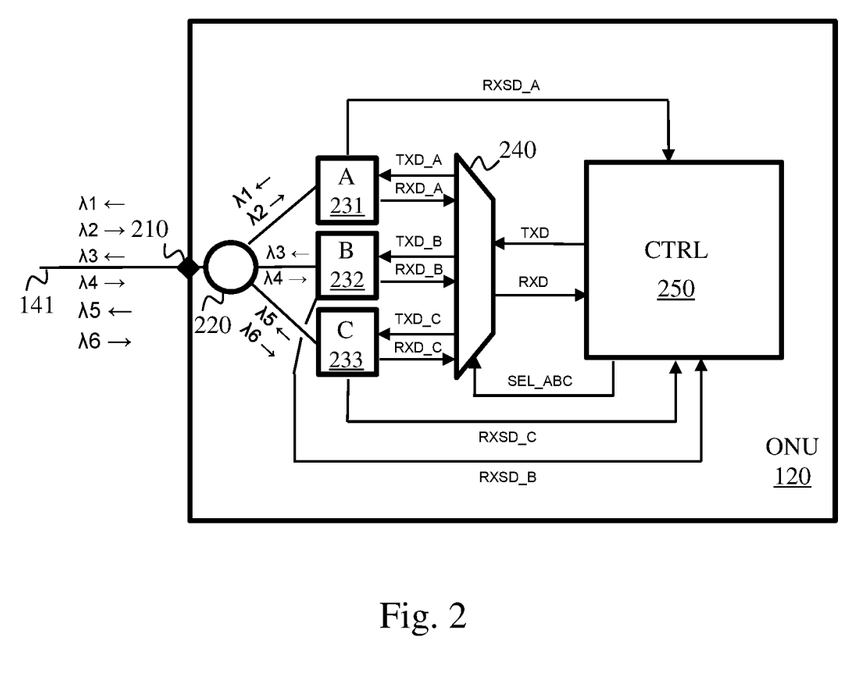
FIG. 2 illustrates schematically an embodiment of user equipment of the optical access network.

FIG. 2 illustrates schematically an arrangement of ONU equipment 120.

The ONU equipment 120 comprises an optical coupling 210 to which the optical fibre is connected, for example the user optical line 141, making it possible to connect the ONU equipment 120 to the rest of the optical access network 100.

The ONU equipment 120 furthermore comprises a wavelength multiplexer/demultiplexer 220 for combining and respectively separating the optical signals carried by the optical fibre 141 plugged into the optical coupling 210.

By way of illustration, on FIG. 2, the ONU equipment 120 comprises three branches (A, B and C). Each branch supports a transmission direction (TX) and a reception direction (RX), each having a particular carrier wavelength ($\lambda 1$, $\lambda 3$ and $\lambda 5$ in transmission, and $\lambda 2$, $\lambda 4$ and $\lambda 6$ in reception) or a comb of particular carrier wavelengths.

It should be noted that one and the same branch can support a plurality of protocols and therefore a plurality of transport systems. When a plurality of transport systems use the same carrier wavelengths in the optical access network, the use of these carrier wavelengths is shared timewise between the transport systems in accordance with a time division multiple access TDMA principle.

Thus it should also be noted that FIG. 2 shows three branches by way of illustration and that the ONU equipment 120 can therefore comprise a different number of branches.

Optical-electrical interfaces 231, 232, 233 each comprise a laser diode (for the transmission TX) and a photodiode (for the reception RX) making it possible to convert optical signals into electrical signals and vice versa.

The ONU equipment 120 comprises a control unit CTRL 250.

When the ONU equipment 120 comprises a plurality of branches, the ONU equipment 120 furthermore comprises an electrical-signal switch 240. The branch to be used is selected by the control unit CTRL 250 by means of a selection line SEL_ABC.

Thus, when the branch A is selected by the control unit CTRL 250 and optical signals are detected in reception on the branch A, the optical-electrical interface 231 informs the control unit CTRL 250 of this by means of a signal RXSD_A. The electrical-signal switch 240 is then configured for routing signals present on a signal line RXD_A coming from the optical-electrical interface 231 to a signal line RXD at the input of the control unit CTRL 250. In addition, when optical signals are to be transmitted by means of the branch A, the electrical-signal switch 240 is configured for routing signals present on a signal line TXD coming from the control unit CTRL 250 to a signal line TXD_A at the input of the optical-electrical interface 231.

In a similar manner, when the branch B is selected by the control unit CTRL 250 and optical signals are detected in reception on the branch B, the optical-electrical interface 232 informs the control unit CTRL 250 of this by means of a signal RXSD_B. The electrical-signal switch 240 is then configured for routing signals present on a signal line RXD_B coming from the optical-electrical interface 232 to the signal line RXD. In addition, when optical signals are to be transmitted by means of the branch B, the electrical-signal switch 240 is configured for routing signals present on the signal line TXD to a signal line TXD_B at the input of the optical-electrical interface 232.

Finally, when the branch C is selected by the control unit CTRL 250 and optical signals are detected in reception on the branch C, the optical-electrical interface 233 informs the control unit CTRL 250 of this by means of a signal RXSD_C. The electrical-signal switch 240 is then configured for routing signals present on a signal line RXD_C coming from the optical-electrical interface 233 to the signal line RXD. In addition, when optical signals are to be transmitted by means of the branch C, the electrical-signal switch 240 is configured for routing signals present on the signal line TXD to a signal line TXD_C at the input of the optical-electrical interface 233.

An arrangement of OLT equipment 110 is easily derivable from the arrangement in FIG. 2. In the case of transmission by TDMA access, the control unit CTRL 250, by means of the selection line SEL_ABC, times the selection of the branch A, B or C (when the OLT equipment 110 comprises three branches) applicable for each timeslot defined by the time sharing of the access to the optical fibre. When the various transport systems can be used simultaneously in time, the signal lines TXD_A, TXD_B, TX_C, RXD_A, RXD_B and RXD_C are directly connected to the control unit CTRL 250 which, in the absence of an electrical-signal switch 240, is configured for managing them in parallel.

Figure 3:
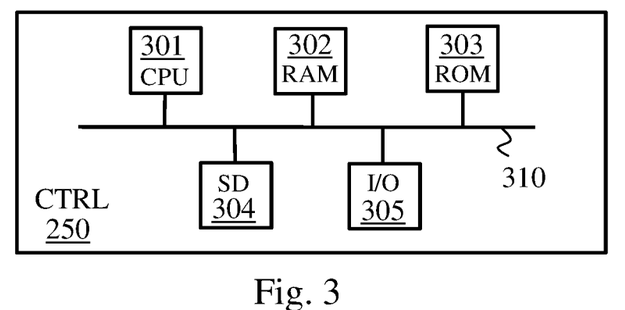
FIG. 3 illustrates schematically an example of hardware arrangement of a control unit of the embodiment in FIG. 2.

FIG. 3 illustrates schematically an example of hardware arrangement of the control unit CTRL 250. The example of hardware arrangement presented comprises, connected by a communication bus 310: a processor CPU 301; a random access memory RAM 302; a read only memory ROM 303 and a flash memory; a storage unit or a storage medium reader, such as an SD (Secure Digital) card reader 304 or a hard disk HDD (hard disk drive); and at least one input-output assembly I/O 305 for in particular connecting the signal lines TXD and RXD.

The processor CPU 301 is capable of executing instructions loaded in the RAM memory 302 from the ROM memory 303, from an external memory (such as an SD card), from a storage medium (such as a hard disk HDD), or from a communication network (other than the optical access network 100). When the control unit CTRL 250 is powered up, the processor CPU 301 is capable of reading instructions from the RAM memory 302 and executing them. These instructions form a computer program causing the implementation, by the processor CPU 301, of all or some of the behaviours, algorithms and steps described here.

Thus all or some of the behaviours, algorithms and steps described here can be implemented in software form by executing a set of instructions by a programmable machine, such as a DSP (digital signal processor), or a microcontroller or a processor. All or some of the behaviours, algorithms and steps described here can also be implemented in hardware form by a machine or a component (chip) such as an FPGA (field-programmable gate array) or an ASIC (application-specific integrated circuit). Thus the control unit CTRL 250 comprises electronic circuitry adapted and configured for implementing the behaviours, algorithms and steps described here.

Figure 4:
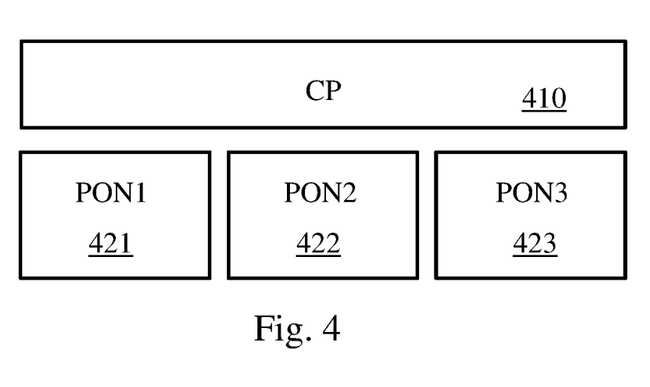
FIG. 4 illustrates schematically a protocol arrangement implemented by the control unit.

FIG. 4 illustrates schematically a protocol arrangement implemented by the control unit CTRL 250.

The protocol arrangement in FIG. 4 comprises a first protocol stack PON1 421 dedicated to a first transport system of the optical access network 100, a second protocol stack PON2 422 dedicated to a second transport system of the optical access network 100, and a third protocol stack PON3 423 dedicated to a third transport system of the optical access network 100. The arrangement can thus comprise one or more other protocol stacks dedicated to one or more other respective transport systems of the optical access network 100, in parallel with the protocol stacks PON1 421, PON2 422 and PON3 423.

These protocol stacks have a common protocol layer CP 410 fitting on top of them. Thus the common protocol layer CP 410 can communicate in the optical access network 100 by means of any one of the capped protocol stacks.

According to a particular embodiment, the common protocol layer CP 410 is of the OMCI type ("ONU Management and Control Interface"), as described by the ITU-T G.988 standard. The protocol layer OMCI defines a mechanism and message formats that can be used by OLT equipment for configuring, managing and monitoring items of ONU equipment that are connected thereto. The messages from the OMCI protocol layer are transported through a channel called OMCC ("ONU Management and Control Channel") and are encapsulated in GEM ("GPON Encapsulation Method") frames. Relying on the OMCI protocol layer makes it possible to benefit from a mechanism for managing the ONU equipment that is already widespread on the market of optical access networks, and which is consequently compatible with the network equipment of many manufacturers. In addition, the OMCI protocol layer makes it possible to add supplementary messages, thus making it possible to develop easily the optical access networks with new functionalities. A proprietary protocol layer can however in a variant be used for implementing the common protocol layer CP 410.

Figure 5:
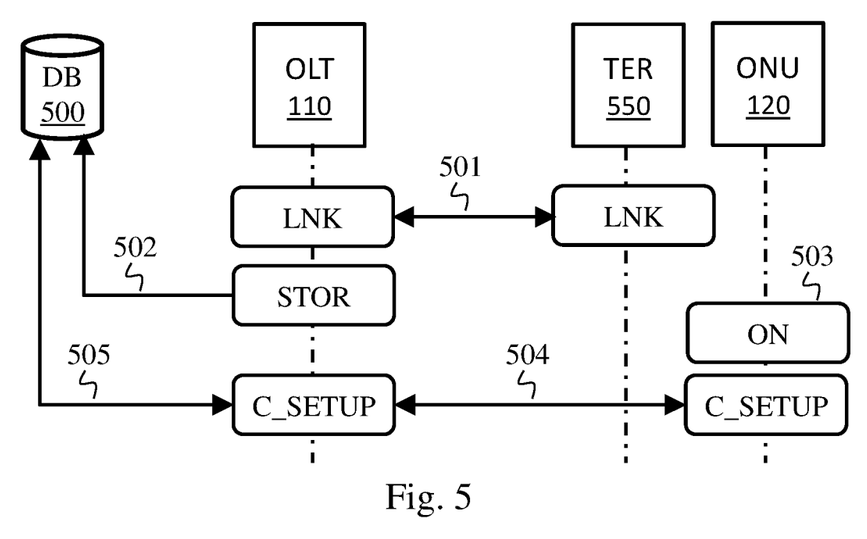
FIG. 5 illustrates schematically exchanges in the context of associating an identifier of an item of user equipment in the optical access network with a user profile.

FIG. 5 illustrates schematically exchanges in the context of associating an identifier of an item of ONU user equipment 120, such as a serial number, with a user profile.

When a user takes out a service subscription (for example, but not exclusively, a subscription for access to the internet), the user selects a particular service corresponding to his requirements and the technical features of which are known and defined (speed, transport system on optical fibre, data volume, other accessible services, etc.). User profiles describing which services are accessible to the users with which they are respectively associated describe these technical features and are stored in a database DB 500 accessible from the OLT equipment 110. Over time, the services to be made accessible to a user via his ONU equipment 120 may change, and thus the user profile associated with this user may change accordingly. However, at any moment, a user profile enables only one transport system for the ONU equipment 120 to which said user profile is applicable. For example, a service operator may over time change his optical access network infrastructure 100, and add transport systems that the ONU equipment 120 could natively use but which were up until then not made available to it via the optical access network 100. The service operator may also over time change his optical access network infrastructure 100 by eliminating one or more transport systems present up until then.

The OLT equipment 110 must be in a position to make the link between the ONU equipment 120 installed at a user and the user profile applicable to this user. It is possible to provision the database DB 500 in advance, by associating an identifier of the ONU equipment 120 in question with the user profile applicable. This does however require making this association before supplying the ONU equipment 120 to the user, which prevents provisioning distribution points of the ONU equipment in advance, and which may require procedures that are expensive and complex for the service operator. FIG. 5 proposes an alternative approach that makes it possible to simplify this phase, by provisioning the database DB 500 after having supplied the ONU equipment 120 to the user.

When the ONU equipment 120 is installed at the user, the user or an installer uses a terminal TER 550 for declaring the link between the ONU equipment 120 and the user profile. The terminal TER 550 is for example a computer, a mobile telephone, a smartphone or a tablet. The terminal TER 550 comprises an application or a browser for connecting to a server, for example embedded in the OLT equipment 110, in order to provide information to be associated with a user profile stored in the database DB 500. The server may for example export a web portal to enable the user or the installer to make entries of information. In a variant, the terminal TER 550 declares to the server the link between the ONU equipment 120 and the user profile by a text message of the SMS (Short Message Service) type.

We shall consider by way of illustration that the server in question is embedded in the OLT equipment 110.

Thus, in a step 501, the terminal TER 550 interacts with the OLT equipment 110 to provide information on association between an identifier of the ONU equipment 120 being installed at the user and information representative of the user profile (operation labelled LNK on FIG. 5). For example, the identifier of the ONU equipment 120 is a serial number entered on a casing of the ONU equipment 120 or a box for packaging the ONU equipment 120, which the user or the installer enters via the terminal TER 550. According to another example, the identifier of the ONU equipment 120, such as its serial number, is presented on the casing of the ONU equipment 120 or its packaging box by means of a bar code, optionally two dimensional (called QR code), and the terminal TER 550 is provided with an optical reader adapted for scanning such bar codes. According to yet another example, the identifier of the ONU equipment 120, such as its serial number, is presented by the ONU equipment 120 via a web server embedded in the ONU equipment 120 and accessible via an interface of the local area network LAN of the ONU equipment 120. The information representative of the user profile may be a customer number or a service contract number.

In a step 502, the OLT equipment 110 stores in the database DB 500 the link between the user profile and the ONU equipment 120 supplied to the corresponding user (operation labelled STOR on FIG. 5). Thus, when the ONU equipment 120 in question subsequently seeks to be put in communication in the optical access network 100 and thus to access, the OLT equipment 110 is able to determine which services and technical features correspond to the user profile applicable.

In a step 503, the ONU equipment 120 is switched on (operation labelled ON on FIG. 5) and is connected to the user optical line 141 intended for the user in question.

In a step 504, the ONU equipment 120 and the OLT equipment 110 interact in order to configure the ONU equipment 120 for using the transport system as defined in the applicable user profile (operation labelled C_SETUP on FIG. 5). During this operation, the OLT equipment 110, in a step 505, accesses the database DB 500 in order to recover the user profile applicable according to an ONU equipment identifier submitted by the ONU equipment 120. This aspect is detailed below in relation to FIG. 6.

Figure 6:
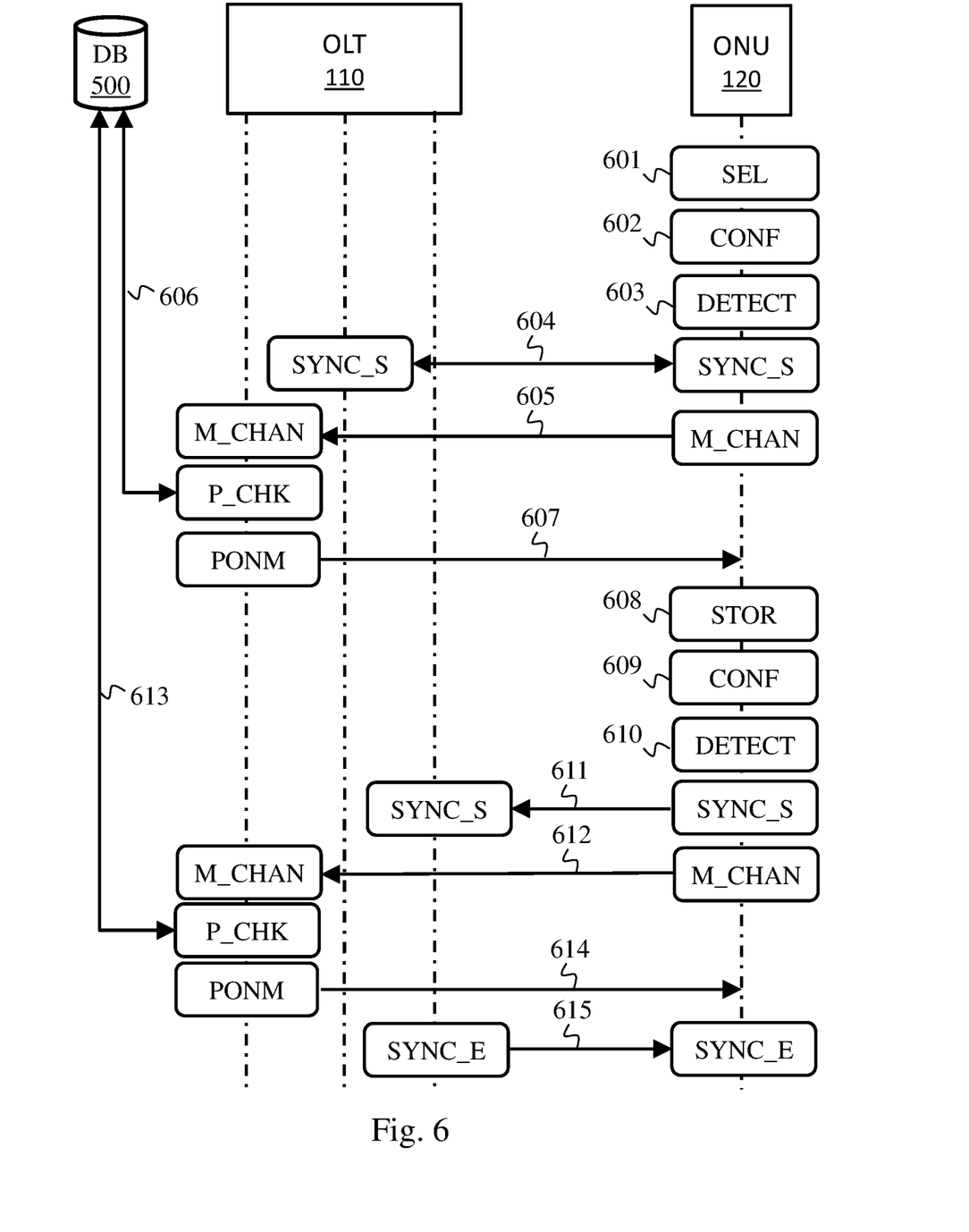
FIG. 6 illustrates schematically exchanges in the context of putting the user equipment in communication with an item of termination equipment in the optical access network in accordance with the user profile.

FIG. 6 illustrates schematically exchanges in the context of putting ONU equipment 120 in communication with the OLT equipment 110 in accordance with the user profile applicable. It is considered, at the launch of the algorithm in FIG. 6, that the database DB 500 is provisioned with the user profile applicable to the ONU equipment 120, in association with the identifier of the ONU equipment 120. At the launch of the algorithm in FIG. 6, the ONU equipment 120 is capable of communicating in the optical access network 100 by means of at least two distinct transport systems (or at least three distinct transport systems in a particular embodiment) but does not have knowledge of the transport system declared in the user profile applicable.

In a step 601, the ONU equipment 120 starts up and selects (operation labelled SEL on FIG. 6) a default transport system among the transport systems supported by the ONU equipment 120. For example, information representative of the default transport system is stored in a parameter WanMode in non-volatile memory of the ONU equipment 120. For example, the parameter WanMode indicates that the ONU equipment 120 must use by default a transport system of the G-PON type, which may however not correspond to the transport system declared in the user profile applicable.

In a step 602, the ONU equipment 120 configures itself to enable it to communicate in the optical access network 100 using the default transport system (operation labelled CONF on FIG. 6). The ONU equipment 120 establishes for example a dedicated driver, and configures the appropriate branch (see FIG. 2) to transmit and receive signals via the default transport system.

In a step 603, the ONU equipment 120 awaits the detection of optical carrier wavelength signals (or carrier wavelength comb) associated with the transport system configured (operation labelled DETECT on FIG. 6).

In a variant embodiment, wherein the ONU equipment 120 does not have information available defining a default transport system (e.g. parameter WanMode set to a value not representative of a default transport system), the ONU equipment 120 goes directly into optical signal detection mode. The ONU equipment 120 can then determine the carrier wavelength (or the carrier wavelength comb) of the optical signals detected and determine therefrom which transport system to select to configure itself.

In a step 604, the ONU equipment 120 starts a synchronisation operation (startup labelled SYNC_S on FIG. 6) with the OLT equipment 110 according to the transport system configured. The ONU equipment 120 then submits its identifier, such as its serial number. As defined for example in the ITU-T G.984.1 standard for a transport system of the G-PON type, this synchronisation operation may take a certain amount of time. It is however possible not to await the end of this synchronisation operation at the protocol stack of the transport system in question to begin to transmit messages according to the common protocol layer CP 410, provided that the OLT equipment 110 has recognised that the identifier submitted by the ONU equipment 120 corresponds to an authorised identifier. Typically the synchronisation operation starts with a frame-start detection by the ONU equipment 120. The frame start is for example marked by a physical control block PCB with a dedicated synchronisation field PSYNC. Considering that the ONU equipment 120 has detected such a frame start (e.g. field PSYNC containing a valid value), the ONU equipment 120 is able to determine the instants of following cycle starts (division of the time into cycles of predefined duration). The ONU equipment 120 then awaits receiving network parameters (e.g. in a message called "Upstream_Overhead") and configures itself in accordance with these network parameters. Then, on request from the OLT equipment 110, the ONU equipment 120 transmits its identifier (e.g. serial number). In the case where the identifier submitted by the ONU equipment 120 corresponds to an authorised identifier, ranging exchanges occur to determine an equalisation delay to be applied by the ONU equipment 120 in its transmissions in the optical access network 100 to avoid collisions with other items of ONU equipment present in the optical access network 100 and to compensate for differences in length between the optical lines of users 141. At this instant, a control channel by means of the common protocol layer CP 410 can be established, although the synchronisation operation is not complete for the protocol of the transport system. This is because, to complete the synchronisation operation, at least exchanges still have to be made in order to authenticate the ONU equipment 120, beyond the identification provided by its identifier (e.g. serial number). An authentication key verification, seen as a password and supplied by the ONU equipment 120 to the OLT equipment 110, is then made. This type of operation is well known for being particularly time consuming.

Thus, in a step 605, a control channel by means of the common protocol layer CP 410 is established between the OLT equipment 110 and the ONU equipment 120 (operation labelled M_CHAN on FIG. 6) without awaiting the end of the synchronisation operation in the transport system configured by the ONU equipment 120. In this control channel, the ONU equipment 120 can retransmit its identifier to the OLT equipment 110.

In a step 606, the OLT equipment 110 checks, with the database DB 500, which transport system is declared in the user profile associated with the identifier submitted by the ONU equipment 120 (operation labelled P_CHK on FIG. 6).

In a step 607, the OLT equipment 110 generates and transmits, by the common protocol layer CP 410, a message that indicates to the ONU equipment 120 which transport system to be used according to the user profile that is associated therewith. For example, in accordance with the message formats of the protocol layer OMCI, the message in question may include a new configuration object, of the Managed Entity type, called PonMode, and this configuration object contains information representative of (e.g. a known predefined code of the ONU equipment 120) the transport system to be used. Should the database DB 500 not yet be provisioned with an association between the identifier of the ONU equipment 120 and a user profile, then an error code is transmitted to the ONU equipment 120, which must then subsequently reiterate its attempt at connection to the optical access network 100.

In a step 608, unless an error code has been received, the ONU equipment 120 checks whether the message received from the OLT equipment 110 points to the same transport system as the one used by default by the ONU equipment 120. If such is the case, the synchronisation operation continues between the OLT equipment 110 and the ONU equipment 120 for the transport system selected by default by the ONU equipment 120. Otherwise, as considered in FIG. 6, the ONU equipment 120 stores in memory information indicating that the default transport system is the one indicated in the message received from the OLT equipment 110 (operation labelled STOR on FIG. 6). Typically, the parameter WanMode is thus updated. In this way, when the ONU equipment 120 next starts up, the transport system tested first by the ONU equipment 120 is highly probably the one that will be applicable for accessing the services.

In a step 609, the ONU equipment 120 configures itself to enable it to communicate in the optical access network 100 using the transport system indicated by the OLT equipment 100 (operation labelled CONF on FIG. 6). The ONU equipment 120 for example establishes a dedicated driver, and configures the appropriate branch (see FIG. 2) for transmitting and receiving signals via the default transport system.

In a step 610, the ONU equipment 120 awaits detecting optical carrier wavelength signals (or carrier wavelength comb) associated with the transport system configured (operation labelled DETECT on FIG. 6).

In a step 611, the ONU equipment 120 starts a synchronisation operation (start-up labelled SYNC_S on FIG. 6) with the OLT equipment 110 according to the transport system configured. The ONU equipment 120 then submits its identifier, such as its serial number.

In a step 612, a control channel is established between the OLT equipment 110 and the ONU equipment 120 (operation labelled M_CHAN on FIG. 6) without awaiting the end of the synchronisation operation with regard to the transport system configured by the ONU equipment 120. In this control channel, the ONU equipment 120 can retransmit its identifier to the OLT equipment 110.

In a step 613, the OLT equipment 110 checks, with the database DB 500, which transport system is declared in the user profile associated with the identifier submitted by the ONU equipment 120 (operation labelled P_CHK on FIG. 6).

In a step 614, the OLT equipment 110 generates and transmits by the common protocol layer CP 410 a message that indicates to the ONU equipment 120 which transport system to be used according to the user profile that is associated with it, as in the step 607.

The step 614 repeats in substance the step 607, because the OLT equipment 110 is still acting in the same way when an item of ONU equipment starts a synchronisation. If the OLT equipment 110 temporarily stores in memory the fact that it has transmitted, to the ONU equipment 120 in question, a message that indicates to it which transport system to use, then the OLT equipment 110 can avoid having to reinterrogate the database DB 500 and having to transmit once again a message that indicates to the ONU equipment 120 which transport system to use.

In a step 615, the ONU equipment 120 checks whether the message received from the OLT equipment 110 points to the same transport system as the one recently used by the ONU equipment 120, which is the case here. Then the synchronisation operation continues and ends (end labelled SYNC_E on FIG. 6) between the OLT equipment 110 and the ONU equipment 120 for the transport system recently selected by the ONU equipment 120. Once the synchronisation operation has ended, the ONU equipment 120 can access the services defined in the user profile that is associated therewith, using the transport system configured and synchronised.

Thus, by means of the message transmitted by the common protocol layer CP 410, the ONU equipment 120 can directly switch to the transport system to be used (if it is not already using it) without awaiting the end of the synchronisation, which accelerates its establishment of communication in the optical access network 100.

In addition, by virtue of the message transmitted by the common protocol layer CP 410, the ONU equipment 120 can know which transport system to use for accessing the services, even if the ONU equipment 120 initially uses to do this a transport system that does not correspond to the user profile that is associated therewith. By telling, via the common protocol layer CP 410, which transport system is indicated in the user profile associated with the ONU equipment 120 in question, the ONU equipment 120 can directly switch to the appropriate transport system. This avoids the ONU equipment 120 testing more transport systems than necessary among all the transport systems that the ONU equipment 120 supports (when the ONU equipment 120 supports at least three transport systems).

The common protocol layer CP 410 can also be used for switching the ONU equipment 120 onto another transport system, for example when the user has taken out a new service offer or because the service operator temporarily wishes to perform a maintenance operation on the transport system currently being used by the ONU equipment 120 and it wishes to continue to offer services via the optical access network 100 during the maintenance operation, the user profile associated with the ONU equipment 120 then being temporarily modified accordingly. This aspect is detailed below in relation to FIG. 7.

It may be that the ONU equipment 120 is faced with an item of OLT equipment not supporting the automatic configuration method described here in relation to FIG. 6. In this case, after the start of the synchronisation, if the message awaited from the OLT equipment signifying which transport system to use is not received in a time window of predefined duration, the ONU equipment 120 awaits the finalisation, positive or negative, of the synchronisation. And, should the synchronisation not succeed (the transport system selected by the ONU equipment 120 is not the correct one), the ONU equipment 120 selects another transport system among those supported by the ONU equipment 120 and reattempts synchronisation with the OLT equipment, and so on until it finds the transport system that corresponds to the user profile that is associated therewith.

Figure 7:
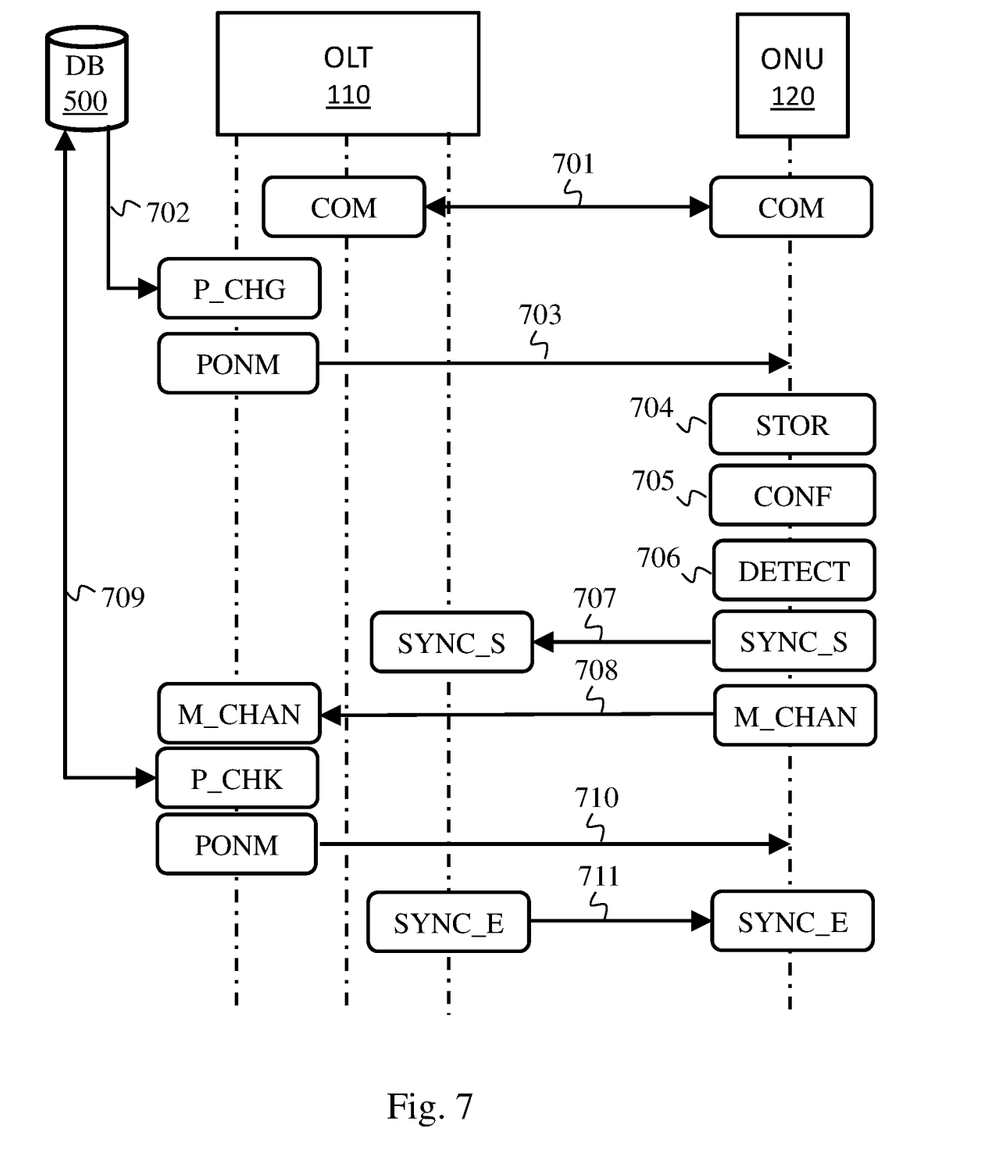
FIG. 7 illustrates schematically exchanges in the context of putting the user equipment in communication with the termination equipment of the optical access network, in the case of a change of user profile.

FIG. 7 illustrates schematically exchanges in the context of putting an item of ONU equipment 120 in communication with the OLT equipment 110, in the case of a change of user profile.

In a step 701, a communication is established between the ONU equipment 120 and the OLT equipment 110 (operation labelled COM on FIG. 7), and the ONU equipment 120 accesses the services described in the user profile that is associated therewith, by means of the transport system indicated in the user profile. The procedure described above in relation to FIG. 6 was applied to do this.

In a step 702, the OLT equipment 120 detects that the user profile associated with the ONU equipment 120 has been modified (operation labelled P_CHG on FIG. 7) and that the ONU equipment 120 must consequently switch onto another transport system.

In a step 703, the OLT equipment 110 generates and transmits by the common protocol layer CP 410 a message that indicates to the ONU equipment 120 which transport system to use according to the user profile that is associated therewith. For example, in accordance with the message formats of the OMCI protocol layer, the message in question may include the new configuration object PonMode. And this configuration object contains information (e.g. a predefined code known to the ONU equipment 120) representative of the transport system to be used.

On reception of this message, the ONU equipment 120 launches an attempt at synchronisation on the new transport system pointed to by the OLT equipment 110. Then, in a step 704, the ONU equipment 120 stores in memory information indicating that the default transport system is the one indicated in the message received from the OLT equipment 110 (operation labelled STOR on FIG. 6). Typically, the parameter WanMode is thus updated.

Then, in a step 705, the ONU equipment 120 configures itself to enable it to communicate in the optical access network 100 using the transport system indicated by the OLT equipment 110 (operation labelled CONF on FIG. 7). The ONU equipment 120 for example establishes a dedicated driver, and configures the appropriate branch (see FIG. 2) for transmitting and receiving signals via the default transport system.

In a step 706, the ONU equipment 120 awaits detecting optical carrier wavelength signals (or carrier wavelength comb) associated with the transport system configured (operation labelled DETECT on FIG. 7).

In a step 707, the ONU equipment 120 starts an operation of synchronisation (labelled SYNC_S on FIG. 7) with the OLT equipment 110 according to the transport system configured. The ONU equipment 120 then submits its identifier, such as its serial number.

In a step 708, a control channel is established between the OLT equipment 110 and the ONU equipment 120 (operation labelled M_CHAN on FIG. 7) without awaiting the end of the synchronisation operation with regard to the transport system configured by the ONU equipment 120. In this control channel, the ONU equipment 120 can retransmit its identifier to the OLT equipment 110.

In a step 709, the OLT equipment 110 checks, with the database DB 500, which transport system is declared in the user profile associated with the identifier submitted by the ONU equipment 120 (operation labelled P_CHK on FIG. 7).

In a step 710, the OLT equipment 110 generates and transmits by the common protocol layer CP 410 a message that indicates to the ONU equipment 120 which transport system to use according to the user profile that is associated therewith, as in the step 703.

The step 710 repeats in substance the step 703, because the OLT equipment 110 is still acting in the same way when an item of ONU equipment starts a synchronisation. If the OLT equipment 110 temporarily stores in memory the fact that it has transmitted to the ONU equipment 120 in question a message that indicates to it which transport system to use, then the OLT equipment 110 can avoid having to reinterrogate the database DB 500 and having to once again transmit a message that indicates to the ONU equipment 120 which transport system to use.

In a step 711, the ONU equipment 120 checks whether the message received from the OLT equipment 110 is pointing to the same transport system as the one recently used by the ONU equipment 120, which is the case here. Then the synchronisation operation continues and ends (labelled SYNC_E on FIG. 7) between the OLT equipment 110 and the ONU equipment 120 for the transport system recently selected by the ONU equipment 120. Once the synchronisation operation has ended, the ONU equipment 120 can access the services defined in the modified user profile that is associated with it, using the transport system configured and synchronised.

Thus also no human intervention is necessary when the user profile is updated with another transport system than the one previously in force.

It should be noted that, in the case where the ONU equipment 120 does not detect any signals while being configured for the transport system defined by default (reference to the parameter WanMode) during a time window of predefined duration, then the ONU equipment 120 tests another transport system among those supported by the ONU equipment 120. This is because the service operator may have eliminated the transport system in question from the optical access network 100.

It should also be noted that the transport system defined by default (reference to the WanMode parameter) can be modified by a means other than by messages coming from the OLT equipment 110, for example for test requirements.

It should also be noted that, in the case of loss of synchronisation, the ONU equipment 120 reiterates the above procedure in relation to FIG. 6.

The invention claimed is:

1. A method for putting a user equipment of Optical Network Unit ONU type in communication with a line termination equipment of Optical Line Termination OLT type in an optical access network offering various transport systems, the user equipment supporting at least two transport systems, each transport system being a communication set comprising a dedicated protocol, the method comprising:
the user equipment configuring itself for communicating via a first transport system among the transport systems supported by the user equipment;
the user equipment starting a synchronisation with the line termination equipment for the first transport system;
the line termination equipment transmitting, via a protocol layer fitting on top of any transport system of the optical access network, without waiting for the synchronisation with the user equipment for the first transport system to have ended, a first message indicating which transport system is to be used by the user equipment;
when the transport system to be used by the user equipment is the first transport system, the user equipment continuing the synchronisation for the first transport system until communication is established in the optical access network; and
when the transport system to be used by the user equipment is a second transport system different from the first transport system, the user equipment configuring itself for communicating via the second transport system and implements the synchronisation for the second transport system until communication is established in the optical access network.

2. The method according to claim 1, wherein the user equipment transmits, via the first transport system, to the line termination equipment, an identifier of the user equipment and the line termination equipment obtains, in a database, a user profile associated with the identifier of the user equipment, the user profile including the information on the transport system to be used by the user equipment.

3. The method according to claim 2, wherein, when no user profile is associated with the identifier of the user equipment, the first message contains an error message.

4. The method according to claim 1, wherein the protocol layer fitting on top of any transport system of the optical access network is ONU Management and Control Interface OMCI and the first message includes a configuration object of the "Managed Entity" type indicating the transport system to be used by the user equipment.

5. The method according to claim 1, wherein, when a change of transport system to be used by the user equipment occurs and the user equipment is already put in communication in the optical access network, the line termination equipment transmits, via the protocol layer fitting on top of any transport system of the optical access network, a second message indicating which transport system is now to be used by the user equipment, and the user equipment configures itself for communicating via the transport system now to be used and implements the synchronisation for the transport system now to be used until communication is established in the optical access network.

6. The method according to claim 1, wherein the user equipment obtains information representative of the first transport system from a parameter stored in non-volatile memory of the user equipment and, on reception of any message coming from the line termination equipment indicating the transport system to be used by the user equipment, the user equipment updates the parameter with information representative of the transport system to be used by the user equipment as indicated in the message.

7. The method according to claim 1, wherein, when the user equipment does not detect any signals, while having configured itself for the first transport system, during a time window of predefined duration, the user equipment then tests another transport system among those supported by the user equipment.

8. A method for putting a user equipment of Optical Network Unit ONU type in communication with a line termination equipment of Optical Line Termination OLT type in an optical access network, the method being implemented by the user equipment, the user equipment supporting at least two transport systems, each transport system being a communication set comprising a dedicated protocol, the method causing the user equipment to perform:
  configuring the user equipment for communicating via a first transport system among the transport systems supported by the user equipment;
  starting a synchronisation with the line termination equipment for the first transport system;
  receiving, via a protocol layer fitting on top of all the transport systems supported by the user equipment, without waiting for the synchronisation with the line termination equipment for the first transport system to have ended, a message indicating which transport system is to be used by the user equipment;
  when the transport system to be used by the user equipment is the first transport system, continuing the synchronisation for the first transport system until communication is established in the optical access network; and
  when the transport system to be used by the user equipment is a second transport system different from the first transport system, configuring the user equipment for communicating via the second transport system and implementing the synchronisation for the second transport system until communication is established in the optical access network.

9. A non-transitory storage medium storing a computer program comprising instructions for implementing, by a processor, the method according to claim 8 when the program is read and executed by the processor.

10. A method for putting a user equipment of Optical Network Unit ONU type in communication with a line termination equipment of Optical Line Termination OLT type in an optical access network, the method being implemented by the line termination equipment, the line termination equipment supporting various transport systems, each transport system being a communication set comprising a dedicated protocol, the method causing the line termination equipment to perform:
  starting a synchronisation with the user equipment for a first transport system, at an initiative of the user equipment;
  transmitting, via a protocol layer fitting on top of the transport systems supported by the line termination equipment, without waiting for the synchronisation with the user equipment for the first transport system to have ended, a message indicating which transport system is to be used by the user equipment; and
  when the transport system to be used by the user equipment is different from the first transport system, starting a synchronisation with the user equipment for the transport system to be used by the user equipment, at the initiative of the user equipment.

11. A user equipment of Optical Network Unit ONU type intended to be put in communication with a line termination equipment of Optical Line Termination OLT type in an optical access network, the user equipment supporting at least two transport systems, each transport system being a communication set comprising a dedicated protocol, the user equipment comprising electronic circuitry causing the user equipment to perform:
  configuring the user equipment for communicating via a first transport system among the transport systems supported by the user equipment;
  starting a synchronisation with the line termination equipment for the first transport system;
  receiving, via a protocol layer fitting on top of all the transport systems supported by the user equipment, without waiting for the synchronisation with the line termination equipment for the first transport system to have ended, a message indicating which transport system is to be used by the user equipment;
  when the transport system to be used by the user equipment is the first transport system, continuing the synchronisation for the first transport system until communication is established in the optical access network; and
  when the transport system to be used by the user equipment is a second transport system different from the first transport system, configuring the user equipment for communicating via the second transport system and implementing the synchronisation for the second transport system until communication is established in the optical access network.

12. A line termination equipment of Optical Line Termination OLT type intended to be put in communication with a user equipment of Optical Network Unit ONU type in an optical access network, the line termination equipment supporting various transport systems, each transport system being a communication set comprising a dedicated protocol, the line termination equipment comprising electronic circuitry causing the line termination to perform:
  starting a synchronisation with the user equipment for a first transport system, at an initiative of the user equipment;
  transmitting, via a protocol layer fitting on top of the transport systems supported by the line termination equipment, without waiting for the synchronisation with the user equipment for the first transport system to have ended, a message indicating which transport system is to be used by the user equipment; and
  when the transport system to be used by the user equipment is different from the first transport system, starting a synchronisation with the user equipment for the transport system to be used by the user equipment, at the initiative of the user equipment.

13. An optical access network comprising:
  the line termination equipment of the Optical Line Termination OLT type according to claim 12; and
  the user equipment of the ONU type intended to be put in communication with the line termination equipment of the Optical Line Termination OLT type in the optical access network, the user equipment supporting at least two transport systems, each transport system being a communication set comprising a dedicated protocol, the user equipment comprising electronic circuitry causing the user equipment to perform:

configuring the user equipment for communicating via the first transport system;

starting the synchronisation with the line termination equipment for the first transport system;

receiving, via the protocol layer fitting on top of all the transport systems supported by the user equipment, without waiting for the synchronisation with the line termination equipment for the first transport system to have ended, the message indicating which transport system is to be used by the user equipment;

when the transport system to be used by the user equipment is the first transport system, continuing the synchronisation for the first transport system until communication is established in the optical access network; and when the transport system to be used by the user equipment is a second transport system different from the first transport system, configuring the user equipment for communicating via the second transport system and implementing the synchronisation for the second transport system until communication is established in the optical access network.

\* \* \* \* \*